Aug. 12, 1941.   J. H. SISSEL   2,252,043
DRY ICE COUNTER FREEZER AND HARDENER
Filed July 21, 1938   3 Sheets-Sheet 1

INVENTOR
JOHN H. SISSEL
BY A. S. Kroh
ATTORNEY

Aug. 12, 1941.   J. H. SISSEL   2,252,043
DRY ICE COUNTER FREEZER AND HARDENER
Filed July 21, 1938   3 Sheets-Sheet 2

INVENTOR
JOHN H. SISSEL
BY A.S.Kroh
ATTORNEY

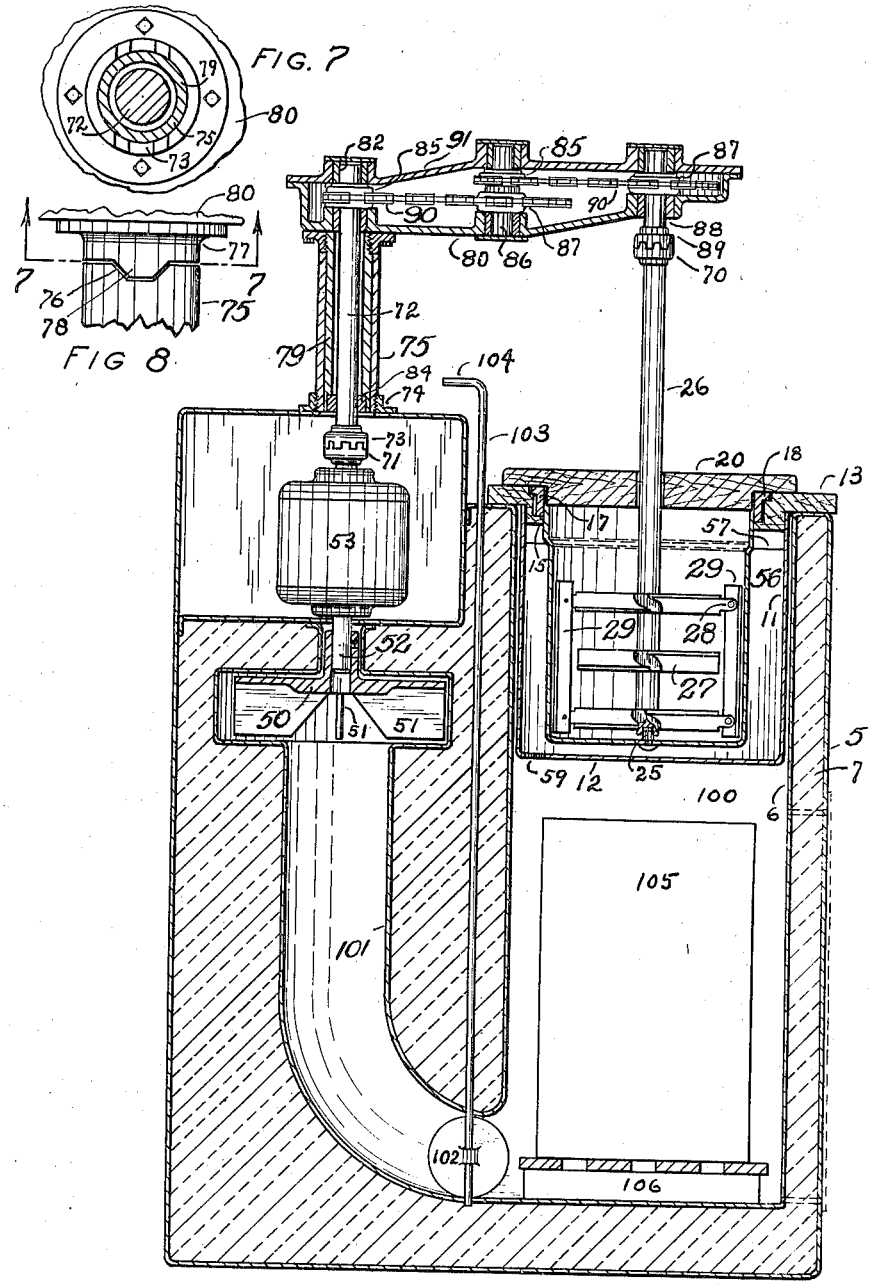

Patented Aug. 12, 1941

2,252,043

UNITED STATES PATENT OFFICE 2,252,043

DRY ICE COUNTER FREEZER AND HARDENER

John H. Sissel, Rock Island, Ill.

Application July 21, 1938, Serial No. 220,479

6 Claims. (Cl. 62—114)

The present invention relates to a device similar in purpose to what is commonly known as a counter freezer. This name heretofore has been applied to counter freezers having a refrigerator plant and a mixing container which acts as the evaporator and wherein it is the custom to drain the mix from the container before it becomes too thick to flow.

In the present invention I use dry ice as the refrigerant and a removable mix container having means whereby air within the device is caused to encircle the dry ice and then encircle the mix container from whence it again moves and contacts the dry ice. The container for the dry ice and mixing chamber, the air moving means and the air ducts form a closed circuit which is thermally insulated from the exterior.

One of the objects of the present invention is to make it convenient to replenish the dry ice supply or to remove and replace the mix container after the mix has been brought to the desired consistency.

Another object of my invention is to provide means whereby hardening may be done by placing the container having the partially frozen mix in a chamber directly below the mixing device around which the cooling air is circulated.

It is therefore, generally stated, an object of the present invention to provide a device for freezing ice cream, malted milk and ices to any desired consistency in an economical and simple manner.

To these and other useful ends my invention consists of parts and combinations of parts or their equivalents, and mode of operation, as hereinafter described and claimed and shown in the accompanying drawings in which:

Fig. 6 is a transverse sectional view of a modification.

Fig. 7 is a transverse sectional view taken on line 7—7 of Figure 8.

Fig. 8 is a fractional side elevation of the clutch throwout mechanism.

Figure 1:
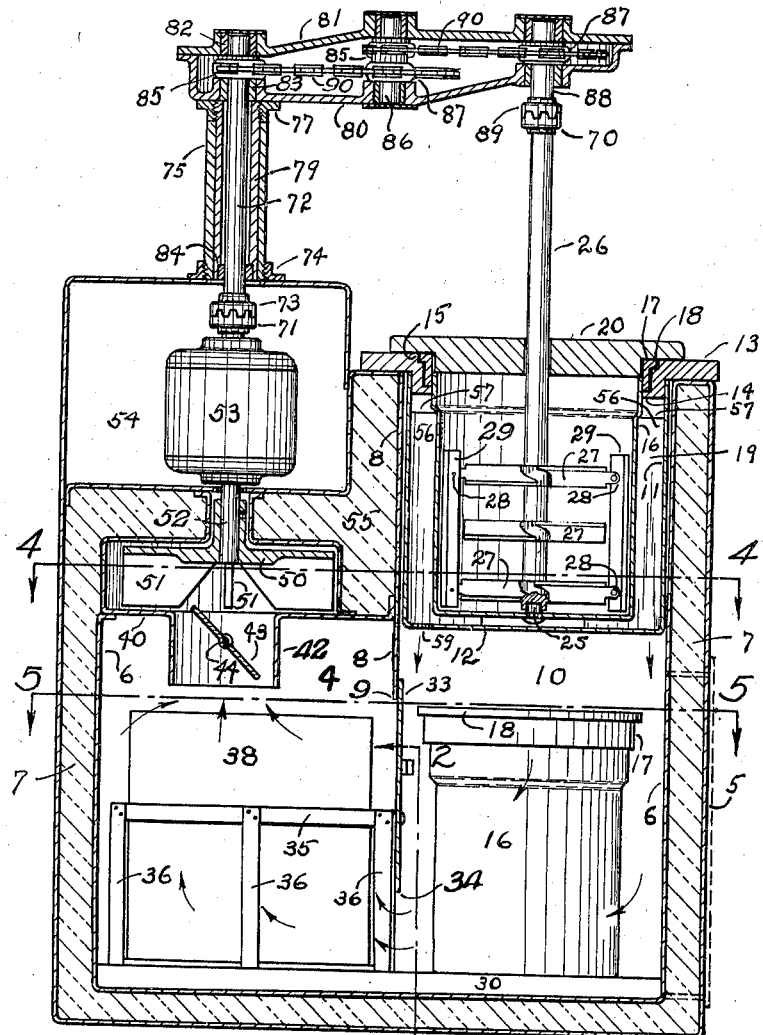
Fig. 1 is a transverse vertically sectioned view of one form of my invention taken on line 1—1 of Figure 3.
Figure 5:
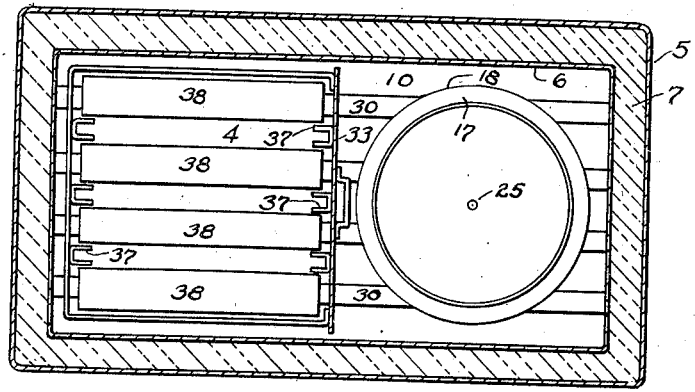
Fig. 5 is a horizontally sectioned view taken on line 5—5 of Figure 1.

As thus illustrated, I provide an exterior wall 5 having an interior housing 6 which is adapted to provide a space for insulating material 7 (see Figures 1 and 5). Part of the space formed by interior housing 6 is divided by a partition wall 8 the wall terminating at its bottom as at 9 forming a mixing and hardening chamber 10 and a dry ice chamber 4.

I provide a rectangular in cross section member 11 having a bottom 12 and being secured to and supported by an annular ring 13. The annular ring is adapted to rest on the top of the housing (see Figure 1) and is provided with an inner flange 14 and a cut-away portion 15.

I provide a circular in cross section mix container 16 having secured thereto an annular ring 17 having an outwardly extending flange 18. Member 17 at its bottom is adapted to rest on flange 14 and member 18 is adapted to rest on the bottom of cut-away portion 15. Thus member 16 is adapted to be inserted into chamber 11 and be supported by annular ring 13 (see Figure 1) thus there is provided an annular chamber 19.

A lid 20 is provided the lower portion of which is adapted to fit snugly into member 17 and contact the end of member 16, the upper portion of member 20 being adapted to rest on members 13 and 17. Thus it will be seen that the interior of member 16 will be sealed at its top by member 20 and the annular space 19 will be sealed at its top by plate 13.

Member 16 is the mixing container of the device and is provided at its bottom with a projecting lug 25. A mixing rotor is provided having a shaft 26, the bottom end of which is preferably adapted to embrace lug 25 and rest on this lug.

I secure stirring arms 27 in spaced relation on shaft 26 as illustrated. The upper and lower arms are provided with lugs 28 to which scraper plates 29 are loosely mounted, thus when shaft 26 is turned in the direction of curvilinear arrow in Figure 4, arms 27 being positioned at angles, will stir and tend to raise the mixture in the mixing container 16. Blades 29 will act to free the mixture from the walls of the mixing container, their front edges being held against the wall by centrifugal action and the action of the mixture in the container.

Thus it will be seen that the mixture will be completely stirred and loosened from the wall of the container and moved downwardly adjacent the shaft and upwardly around the wall of the container.

Chambers 4 and 10 provide a rectangular space as illustrated in Figure 5 on the bottom of which I position spaced strips 30 which act as supports for a mix container 16 and the dry ice supports as follows:

A plate or lid 33 is provided which terminates as at 34 having mounted thereon preferably a metal frame 35. Member 35 is provided with a number of U-shaped bars 36.

Figure 2:
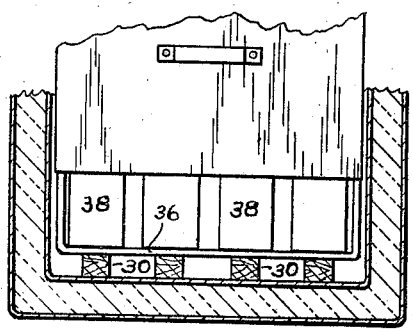
Fig. 2 is a transverse vertically sectioned view taken on line 2—2 of Figure 1.
Figure 3:
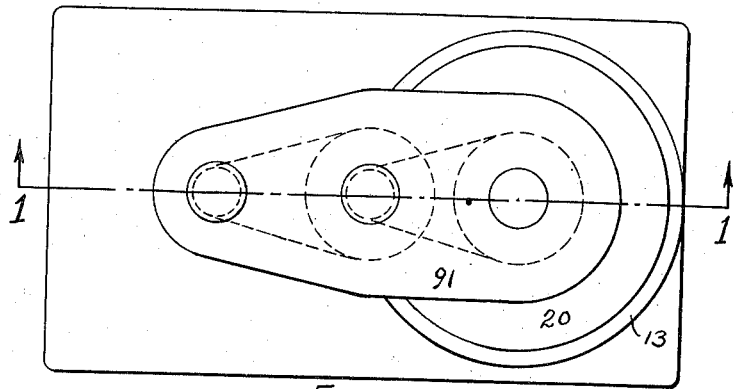
Fig. 3 is a top view of my device.

I mount in spaced relation on members 35 and 36, brackets 37, thus providing spaces into which dry ice slabs 38 may be positioned as illustrated in Figures 2 and 5. Thus it will be seen that container 16 and chamber 11 may be lifted from the housing and an extra container 16 having the semifrozen product may be positioned in the device as illustrated in Figure 1.

When chamber 11 and containers 16 are removed, lid 33 and the parts secured thereto may be moved into chamber 10 whereby a fresh supply of dry ice which has been previously cut into slabs may be placed in position in the holder after which the holder and lid 33 may be moved back into the position shown in Figure 1.

Figure 4:
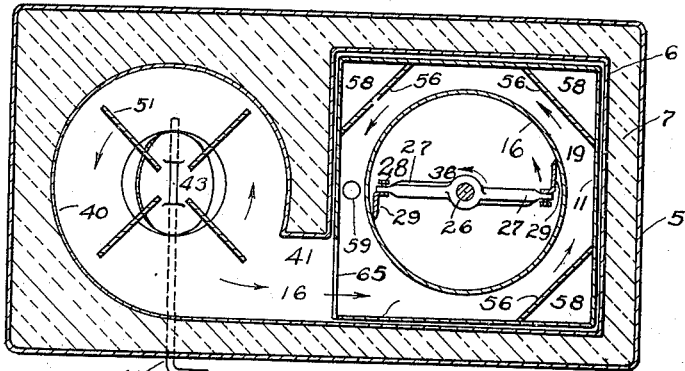
Fig. 4 is a horizontally sectioned view of my device taken on line 4—4 of Figure 1.

I provide a fan housing 40 having an outlet 41 as clearly illustrated in Figure 4 and having an inlet 42 with a regulating damper 43, which is mounted on a shaft 44. Shaft 44 extends through the side of the chamber as illustrated in Figure 4 and has preferably an L-shaped handle 45 whereby the damper may be placed in various positions as a means for regulating the flow of air through the system.

A fan hub 50 is provided with fan blades 51 and is mounted on the motor shaft 52, the motor being designated by reference numeral 53 and is positioned as illustrated within the enclosure 54. The inner and lower edges of chamber 54 are positioned to thereby form a space for insulating material 55.

Referring now to Figures 1 and 4, it will be noted that member 11 is provided with three partitions 56 secured to the bottom 12 of member 11 which has been cut away so as to form air ducts 58 from the top of chamber 19 down into the top of chamber 10 whereby the air being discharged from the fan will circulate around member 16 and then escape over the top of members 56 and move downwardly into chamber 10.

In order to maintain a uniform temperature around member 16 I provide an aperture 59 in member 12 whereby a predetermined volume of air will be permitted to pass directly from the fan outlet into chamber 19. This opening is positioned as shown in Figure 4 and is made of a size which has been experimentally found to cause the mixture throughout the mixing chamber 16 to be evenly frozen.

It will be noted by referring to Figures 1 and 4 that the fan outlet 41 registers with an opening 65 which is cut in the wall of member 11 near its bottom, whereby the entering air will tend to move around member 16 as indicated by arrows.

Some of the air will pass out of the chamber through outlet 59 the rest passing upwardly and into ducts 58 and escaping therefrom into chamber 10 then flowing around member 16 in this chamber as indicated by arrows and into chamber 4 under lid 33. From this point the air will be divided and flow under or between the ice slabs to the fan inlet 42.

Thus it will be seen that I have provided an air circuit having therein in series relation, a fan, a primary premixing container, a container having the premixed product and suitably positioned dry ice slabs whereby when the fan and the mixing rotor are in operation, the device will operate efficiently.

I provide means for driving the mixing rotor as follows:

The upper end of shaft 26 is provided with a clutch member 70 and the upper end of the motor shaft is provided with a clutch member 71. I provide a shaft 72 having at its lower end a clutch member 73 which is adapted to engage clutch member 71.

A flanged bracket 74 is provided having secured thereto a sleeve 75, this sleeve having formed in its top two depressions 76 positioned on opposite sides thereof.

I provide a flanged sleeve 77 which is provided with projecting members 78 which are adapted to engage depressions 76. An inner sleeve 79 is secured to flanged sleeve 77 as indicated, flange 77 being secured to the lower half 80 of the transmission housing. The inner sleeve 79 which is secured to member 77 will act as a vertical pivot for the transmission housing. Member 81 will act as the top half of the housing, being provided with a bearing sleeve 82.

Member 80 is provided with a bearing sleeve 83 and a bearing sleeve 84 is mounted in the lower end of member 79. Thus as illustrated, shaft 72 is rotatably mounted on the bottom of member 79 and on members 80 and 81 as clearly illustrated in Figure 1.

The depressions 76 and member 77 are positioned so member 78 will be engaged by the depressions when the transmission is in an operating position as illustrated in Figure 1. That is, the transmission will be in its lowest position and clutch members 71 and 73 will be engaged.

I secure a small sprocket 85 to shaft 72 and rotatably mount a shaft 86 in the gear housing and mount on this shaft a relatively large sprocket 87 and another small sprocket 85. I similarly mount a shaft 88 in the forward end of the gear housing and secure to the protruding end of this shaft a clutch member 89 which is adapted to engage clutch member 70 simultaneously with the engagement of clutch members 71 and 73.

I mount another large sprocket 87 on shaft 88 and operatively connect sprockets 85 and 87 by means of duplicate roller chains 90, the sprockets being of a size which will reduce considerably the speed of shaft 88. Thus it will be seen by scrutinizing Figures 1, 7 and 8 that the gear housing may be lifted far enough to disengage the clutches and when thus disengaged, the free end of the housing may be swung around on its axis 79 after which clutch members 71 and 73 will be held out of engagement by members 78 which will then rest on the extreme end of tube 75.

The device as shown and described makes it possible to operate the fan with or without the rotor thus after the first mix has been semifrozen its container may be positioned in chamber 10 and the air continue to flow through the circuit so as to solidfy the mixture in this container. When desired another container having fresh mix may be placed in chamber 19 and frozen during the time the first mix is being solidified.

In Figure 6 is illustrated a modification in many respects similar to that illustrated in the other figures. In this figure similar parts to those shown in the other figures are designated by like numerals. However, no hardening chamber is provided. The dry ice chamber 100 is connected at its bottom to the fan inlet by means of an air duct 101 having near its bottom a regulating damper 102 which is preferably mounted on a rod 103 having an L-shaped extension 104 for convenient regulation of the damper.

Thus, as illustrated, the mix container may be conveniently removed and replaced in the same manner as in the other figures and the fan may be operated without operating the mixing rotor.

Clearly many minor detail changes may be made without departing from the spirit and scope of my invention. For example, in Figure 1 is illustrated a convenient means for placing the dry ice and container in chambers 4 and 10. A door may be placed in the side walls of either of these chambers whereby the dry ice or the container may be removed or replaced without disturbing the prefreezing device (see dotted lines in Figures 1 and 6).

I have shown in Figures 1, 2 and 5 the dry ice as being cut in slabs, this is the preferred form. However, under some conditions it may be preferable to dispense with the means for holding the slabs in position and use the solid piece of dry ice 105 as illustrated in Figure 6 and to employ a supporting rack 106 adapted to permit the air to pass under the cake of dry ice as well as around it.

Having thus shown and described my invention, I claim:

1. A device of the class described, comprising in combination a vertically positioned motor and a blower fan driven thereby, said fan being positioned below and a distance from the motor, a vertically positioned rectangular in cross section L-shaped chamber, the upper portion being positioned adjacent the outlet of said fan and being operatively connected thereto, the horizontal part of said chamber extending under said fan and forming an operating connection thereto, a mix container having a rotor positioned in the vertically extending portion of said chamber, said rotor having a detachable operating connection to said motor, means for directing the air from said fan around said mix container and then directing the air into the adjacent horizontal portion of said chamber, said mix container and air directing means being removably positioned in said chamber to thereby make the horizontal chamber accessible whereby dry ice may be placed below said fan and a hardening container may be positioned below said mix container, insulating material positioned around said chamber and fan and between said fan and motor.

2. A device as recited in claim 1 including; the operating means for said rotor comprising a shaft extending vertically therefrom and having a clutch, a shaft extending vertically from said motor having a clutch, power transmitting means between said clutches being vertically pivoted concentric with said motor shaft and means whereby said transmission means may be lifted to disengage said clutches and swung sidewise on said concentric pivot to thereby clear said chamber.

3. A device as recited in claim 1 including; a relatively small orifice positioned adjacent the outlet of said fan and leading directly into the horizontal part of said chamber.

4. A device of the class described, comprising in combination, a motor and a blower fan driven thereby, said fan being positioned a distance from the motor, a vertically positioned rectangular in cross section L-shaped chamber, the upper portion being positioned adjacent the outlet of said fan and being operatively connected thereto, the horizontal portion of said chamber extending under said fan and being operatively connected to the inlet thereof, a mix container positioned in the upper portion of said chamber and having a rotor and means for directing air therearound and then to the adjacent horizontal portion of said chamber, means for driving said rotor, means adapted to operate said fan independent of said rotor, said mix container and air directing means being detachable to thereby form a removable lid for the horizontal portion of said chamber, insulating material positioned around said chamber and fan and between said fan and motor.

5. A device as recited in claim 4 including; a rack slidably positioned in the horizontal portion of said chamber and having means for carrying spaced slabs of dry ice, means whereby said rack may be moved to a position directly under said fan or under the vertical portion of said chamber, a movable deflector partition positioned transversely midway the horizontal part of said chamber and extending from the top of the chamber to within a relatively short distance of the bottom thereof.

6. A device of the class described, comprising in combination, a vertically positioned motor having a blower fan positioned a distance below said motor and having an operating connection thereto, a vertically positioned chamber having an operating connection midway its length to the outlet of said fan, the inlet to said fan having a duct connection to the bottom of said chamber, a mix container positioned in the upper end of said chamber having a mixing rotor, means for driving said rotor, air directing means positioned around said mix container adapted to direct the air around the mix container and then into the lower end of the chamber, said air directing means and mix container being removable thereby to make the bottom of the chamber accessible whereby dry ice may be placed therein and whereby the circulating air will contact the dry ice before reaching said fan, insulating material positioned around said chamber, duct and fan and between the fan and motor to thereby insulate the device from the exterior, means for regulating the quantity of air moved by said fan and means whereby said fan may be operated independent of said rotor.

JOHN H. SISSEL.